US006031552A

United States Patent [19]

Statz et al.

[11] Patent Number: 6,031,552

[45] Date of Patent: *Feb. 29, 2000

[54] PRINTING DEVICE WITH PATTERNED RECORDING SURFACE

[75] Inventors: Hermann Statz, Wayland, Mass.; Anton Rodi, Leiman, Germany

[73] Assignee: Heidelberger Druckmaschinen AG, Heidelberg, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/469,323

[22] Filed: Jun. 6, 1995

Related U.S. Application Data

[63] Continuation-in-part of application No. 08/342,135, Nov. 18, 1994, abandoned.

[51] Int. Cl.[7] .............................. B41J 2/415; B41J 2/385; G03G 13/04; G01D 9/00

[52] U.S. Cl. .......................... 347/159; 347/123; 347/140; 346/150.2; 399/313

[58] Field of Search .................................... 347/159, 112, 347/43, 55, 131, 123, 115, 120, 140; 399/313; 346/150.2

[56] References Cited

U.S. PATENT DOCUMENTS

| | | | |
|---|---|---|---|
| 3,645,618 | 2/1972 | Lancia et al. | 430/101 |
| 3,689,933 | 9/1972 | Klose | 347/132 |
| 3,739,748 | 6/1973 | Rittler et al. | 399/313 |
| 3,759,222 | 9/1973 | Maksymiak | 399/239 |
| 4,792,860 | 12/1988 | Kuehnle | 347/115 |
| 4,862,414 | 8/1989 | Kuehnle | 365/106 |
| 4,897,731 | 1/1990 | Kuehnle | 347/120 |
| 5,029,156 | 7/1991 | Kuehnle | 347/120 |
| 5,063,538 | 11/1991 | Kuehnle | 365/106 |
| 5,103,263 | 4/1992 | Moore et al. | 347/140 |
| 5,315,061 | 5/1994 | Suzuki et al. | 399/239 |
| 5,325,120 | 6/1994 | Kuehnle | 347/115 |
| 5,406,314 | 4/1995 | Kuehnle | 347/123 |

FOREIGN PATENT DOCUMENTS

| | | |
|---|---|---|
| 0 295 364 | 2/1988 | European Pat. Off. . |
| 57-168268 | 10/1982 | Japan . |

OTHER PUBLICATIONS

Pohl, Nonuniform Field Effects: Dielectrophoresis.

Hardenbrook & Ullrich, Microfield Donors for Tochdown Development (Electrophotography: Second International Conference Oct., 1973.

IBM Technical Disclosure Bulletin, vol. 33, No. 1A, Jun. 1990, "Low–Voltage Electrography Using Monocomponent Development", pp. 114–155.

*Primary Examiner*—John Barlow
*Assistant Examiner*—Raquel Yvette Gordon
*Attorney, Agent, or Firm*—Kenyon & Kenyon

[57] ABSTRACT

Disclosed is a recording apparatus comprising a recording member having a recording surface with a variably conductive surface. The recording member may also have a conductive layer under a dielectric layer. Print heads for recording electronic images on dielectric surfaces are also disclosed.

20 Claims, 4 Drawing Sheets

PRINTING DEVICE WITH PATTERNED RECORDING SURFACE

CROSS-REFERENCE TO RELATED APPLICATIONS

This application in a continuation-in-part of U.S. application Ser. No. 08/342,135, filed on Nov. 18, 1994 now abandoned.

FIELD OF THE INVENTION

This invention relates to an apparatus and method for printing and more particularly to an apparatus and methods for electrophoretic and dielectrophoretic printing.

BACKGROUND OF THE INVENTION

Digital systems for generating printed media have become popular in the field of graphic arts printing. Typically, the systems use a digital database from which print forms are generated and deposited either onto a plate which is subsequently mounted in a press or on the print cylinder of a press. In both cases, the print information may be recorded as binary signals which collectively represent the "signature image". These plates or cylinders are always separated in terms of the principle color components of the original image, e.g., cyan, magenta, yellow and black. The color components can be produced sequentially or simultaneously with parallel recording heads. The recording heads that are used in prior art apparatus feature 1) multiple laser beams which sweep transversely across the plate or cylinder at high speed line by line, 2) multiple laser diodes which traverse the recording medium while writing multiple lines in helical fashion, or 3) arrays of light emitting diodes (LEDs) to record serially a helically pattern which represents a mono-color page.

In each case of the prior art, the recording medium is light sensitive; this requires that all prior art apparati have a light-tight recording and printing chamber to avoid accidental exposure of the recording medium. The first approach uses a waterless method to pick up offset ink which is subsequently transferred to the printing substrate. The second approach uses a special liquid electrostatic toner comprising charged particles which are deposited electrostatically on the print member and from there to an offset blanket which, in turn, transfers the toner electrostatically to a sheet of paper or other printing medium. The third approach features the xerographic deposition of dry toner on the light-sensitive print member from which it is transferred directly onto the printing medium using a standard xerographic methodology.

There are several shortcomings associated with those prior art systems. They are designed primarily for short printing runs of simple subject matter. The quality of color image reproductions on these systems varies greatly in terms of chromaticity, resolution and density range. Also, prior art devices are typically quite limited in terms of speed of operation. More particularly, they are hindered by relatively long recording, writing and printing speeds. Further, although their set-up times are shorter than those of classical graphic art systems, their cost per page factors are significantly higher.

Furthermore, charged toner systems typically require toner particles with a relatively large toner size, i.e. greater than or equal to 5 micrometers, so that a uniform charge can be carried by the toner particles. Without the uniform charge, the toner particles become difficult to control and dusting problems arise.

We are also aware of printing apparatus which employs a print cylinder which functions both as an electrode and as a dielectric signal storage member. The print cylinder has a heated, dielectric, mildly ink phobic recording surface in rolling contact with a paper cylinder able to support a printing medium such as paper. Underlying that dielectric surface is a conductive layer which functions as an electrode when an image is being written or recorded on the print cylinder. Disposed around the print cylinder is a write station containing a print head, an inking station capable of dispensing different color thermoplastic inks and an ink transfer station which is actually the nip of the two cylinders. At the write station, a print head, responding to incoming data, deposits on the print cylinder during successive revolutions thereof, electronic latent images representing the color components or signatures of an original image, each such image being in the form of a pattern of electrostatic charge domains or spots whose field strengths vary in accordance with the gray scale or color values of the original image. As the print cylinder rotates, this charge pattern is advanced to the inking station where a heated inking head presents to the plate cylinder surface during successive revolutions of the cylinder, special thermoplastic inks whose colors usually, but not necessarily, correspond to the colors of the images being recorded on that surface by the print head. Usually for subtractive color printing, these colors include cyan, magenta, yellow and black.

When a recorded area on the print cylinder surface sweeps past the inking station, the field lines from the electrostatic charge domains or image spots comprising the latent image thereon take bites of molten ink from the inking head. The field lines may or may not momentarily change during passage under the ink head, depending on the presence of grounded or biased members of the ink head. The ink bite quantities are directly proportional to the field intensities of the charge domains. Thus, the print cylinder surface, despite its inkphobic nature, acquires variable quantities of ink at these image spots which are related to the field strengths at those spots thereby, in effect, developing the latent image on that surface. The ink is held by electrostatic forces to that surface as the developed images advance to the ink transfer station.

At the ink transfer station, the ink, still molten on the print cylinder, and the relatively cool paper on the paper cylinder are rotated through the nip of the two cylinders. At that line of contact, there is a phase transformation of the ink which causes the ink to switch from a liquid condition to a solid condition which results in the instantaneous transfer of the ink to the paper. This adherence and the ink-phobic nature of the cylinder surface overcome the electrical forces holding the ink to the plate cylinder so that there is substantially total transfer of the ink where the ink contacts the paper. As a consequence, the image printed on the paper supported by the paper cylinder corresponds exactly to the latent image impressed on the plate cylinder.

A printing apparatus of the above type is disclosed, for example, in U.S. Pat. No. 5,325,120, the contents of which is hereby incorporated by reference herein.

Very recently there has been developed by Dr. Manfred R. Kuehnle at XMX Corporation, Billerica, Mass. an entirely new printing technique which relies on dielectrophoresis. In accordance with this technique, electrostatic images may be recorded on a print cylinder or other print member using a print head similar to the one described in the above patent. In this case, however, the print member has an anisotropic recording surface so that the electrostatic charge domains applied to that surface by the print head produce nonuniform or nonhomogeneous electrostatic fields at each pixel position which fields extends above the surface of the print member. When those charged areas of the print member are moved opposite the developing medium, i.e., dielectric ink or toner, the field induces an electric dipole moment in that medium through dielectric polarization. The resulting polarized medium is pulled by the field gradient toward the region of highest field. In other words, the polarization charge at one end of the medium in the stronger field is pulled more strongly in the direction of the stronger field, while the opposite and equal polarization charge at the other end of the medium is repelled in the other direction more weakly because of the weaker field there. Thus, the developing medium travels to and adheres to those areas of the print member where the fields are strongest.

Dielectrophoretic printing thus provides electrostatic printing without having to use charged ink or toner particles. That is, while the developing medium is polarized in that the positive and negative charges on the medium are localized because of the presence of a non-uniform electrostatic field, the net charge on the medium is zero. Such uncharged medium, in contrast to the usual charged ink or toner particles, is not bound to the surface by image charge attraction or by interactions with a charge-induced polarization of the dielectric print cylinder. Therefore, it is easier to obtain a clean, fog-free developed image on the print cylinder as compared with the images developed by electrically charged inks or toner particles.

There are various ways of providing a non-uniform electric field on the dielectric surface of a print member such as a print cylinder. For example, as contemplated by Dr. Kuehnle, supra, one may write on the surface using a wire carrying a periodically varying voltage, e.g., AC or rectified AC, with the amplitude of the voltage varying in accordance with the digital input to the printing apparatus.

Alternatively, the non-uniform field applied to the print member may be due to the structure of the print member itself. More particularly, the print member can be provided with a dielectric surface which is anisotropic in that it has a pattern of conductive paths extending from the surface of the dielectric layer to a ground plane underneath that layer. One way of providing these grounded areas or field termination points on the dielectric layer is by forming that layer so that there is a multiplicity of crystallites which have so-called grain boundaries whose electrical conductivity is substantially higher than that within the crystallites themselves. These interface zones between the crystallites provide a periodic pattern of low-resistance paths through the dielectric layer to the ground plane thereby making the dielectric layer anisotropic. Resultantly, when electric charges are applied to the surface, say, by the microtunnel-type write head described in the above patent, the charges will arrange themselves on the surface of the print member to provide a maximum field strength surrounding each grounding point with a rapid fall off of the field strength between the ground points.

It would be desirable, however, to provide a print member such as this whose anisotropic characteristic does not depend upon the morphology or molecular structure of the dielectric layer.

In fields other than direct printing, dielectric surfaces have been placed on a metal roller to facilitate the transfer of uniform amounts of a charged toner. For instance, U.S. Pat. No. 5,315,061 describes a donor or developing roller for transferring a charged toner to a photoconductive belt to develop a latent image carried on the photoconductive belt. The donor roller is made of metal and small dielectric bodies are distributed on its surface. When a frictional charge is generated on the entire surface of the donor roller, electrostatic fields form between the dielectric bodies and the metal surface. Thus small closed electric fields—so-called "microfields"—are produced on the surface of the donor roller. These microfields facilitate the attraction of the charged toner to the donor roller surface. A doctor blade then regulates the toner to a uniform thickness.

The donor roller of U.S. Pat. No. 5,315,061 delivers a homogeneous and even amount of charged toner to permit development of an image on a photoconductive belt. No images are written directly on the donor roller, rather the images are written on the photoconductive belt.

U.S. Pat. No. 3,739,748 also shows a donor roller for transferring charged toner to a xerographic drum. The donor roller has a dielectric surface contacted by styli connected to a voltage source. The styli cannot write images on the donor roller, but rather can merely facilitate the gray scale rendition of the image which is written onto the xerographic drum by an exposing apparatus.

Neither of these donor rollers or their related apparati cause non-homogeneous microfields to exist above the surface of a print member.

SUMMARY OF THE INVENTION

Accordingly, the present invention aims to provide an optoelectric printing apparatus whose print member has an anisotropic dielectric recording layer.

A further object of the invention is to provide such apparatus which is relatively easy to manufacture.

Another object of the invention is to provide an apparatus of this type which is able to sustain high intensity fields of a non-homogeneous nature above the surface of the print member.

Yet another object of the invention is to provide an apparatus with a print member on which very high resolution electronic images may be recorded.

Still a further object of the present invention is to provide effective types of write heads in conjunction with a dielectric surface which can record high resolution electronic images.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, the print member includes a substrate which supports a thin layer of dielectric material which has very high resistivity, e.g., about $10^{15}$ Ohm/cm, to prevent premature charge dissipation. Sandwiched between the substrate and the dielectric layer may be a conductive layer. This conductive layer may either be grounded or left ungrounded, as will be described later with the various embodiments. Present at the working surface of or within the dielectric layer may be a pattern of tiny conductive areas or spots. If present, the spots preferably are patterned periodically with a period at least equal to or smaller than the size of a resolution element or pixel of the electronic image to be recorded on the print member. The conductive spots, which are made of a material with a lower resistivity than the dielectric and are preferably metallic, may in some applications be connected electrically to the conductive plane located under the dielectric layer. Also, in many applications, an abhesive coating covers the surfaces of the dielectric layer and conductive spots so that the recording surface of the print member is mildly ink-phobic. The cross-sections of the spots may be circular, but also may be in any variety of shapes, including rectangular or donut-shaped.

For some applications, electric charges may be applied to the recording surface of the print member by a microtunnel print or write head of the type disclosed in U.S. Pat. No. 5,325,120. Usually these charges represent an image being recorded on the print member. These charges will produce non uniform electric fields which will be strongest around the conductive spots. And the average voltage around each spot will be a monotonic function of the grey color value at that particular location in the electronic image.

It is important to note that the nonuniform fields produced by the conductive spots on the dielectric surface of the recording member will extend above that surface. Thus, when that surface is disposed opposite a source of a dielectric developing medium such as ink or toner, the electric fields will induce an electric dipole moment in the medium through dielectric polarization and the medium will be drawn to the charged areas of the recording surface by the process of dielectrophoresis in amounts proportional to the strengths of those charges. Thus, the developing medium will accumulate around each conductive spot in an amount that is monotonically increasing with the field intensity at that location, thereby developing the electronic image recorded on the print member.

Similar nonuniform fields may be on a print member whose conductive spots are not grounded using a print or write head to be described later having a multiplicity of electrical contacts carrying imagewise dependent voltages. In that case, relatively strong fields are produced around the spots which will fall off rapidly with distance away from the spots. This electrical contact print or write head may also be used to provide positive and negative charges which charge the dielectric surface, as will be described later.

Nonuniform fields may also be created by writing directly on a dielectric surface, with or without spots, using a write head similar to the electric contact write head, but using alternating current instead of direct current. With this write head, an ungrounded conductive layer may be located underneath the dielectric layer, as will be described later.

If conductive spots are present, the spots and any vias or other connections to the ground plane may be formed in the dielectric layer of the print member using conventional printed circuit technology. Therefore, the print members can be manufactured in quantity at relatively low cost. Resultantly, print members such as this should find wide application in presses and other printing apparatus which accomplish dielectrophoretic and electrophoretic printing.

BRIEF DESCRIPTION OF THE DRAWINGS

For a fuller understanding of the nature and objects of the invention, reference should be had to the following detailed description taken in connection with the accompanying drawing, in which.

DESCRIPTION OF THE PREFERRED EMBODIMENTS

Figure 1:
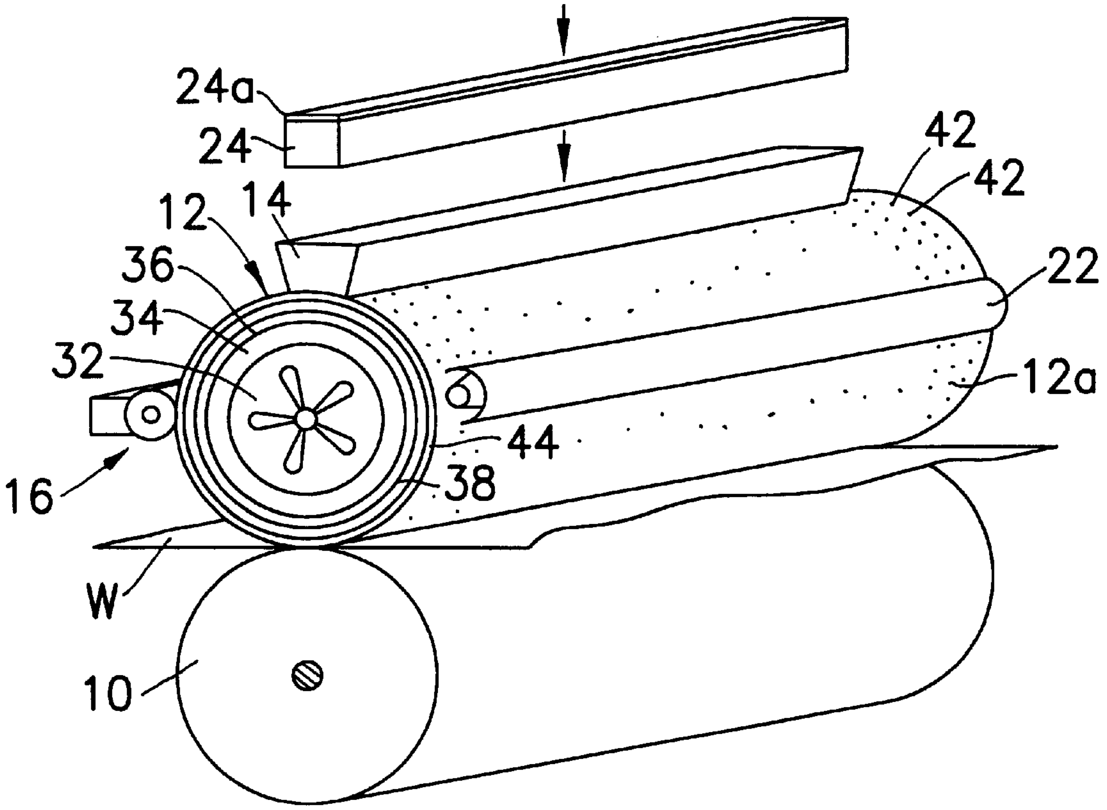
FIG. 1 is an isometric view of printing apparatus including a print cylinder incorporating the invention.

Referring to FIG. 1 of the drawings, the printing apparatus according to the invention includes a rotary paper cylinder 10 for supporting a printing medium such as a paper web W. Positioned parallel to cylinder 10 is a print cylinder 12 which is arranged so that its cylindrical surface just kisses web W. Disposed around print cylinder 12 are an electronic print or write head 14, an inking head 16 which presents a dielectric, non electrically charged ink to the plate cylinder, an ink transfer station 18 constituted by the cylinder nip and an erase head 22 all of whose functions are controlled by a controller 24.

Controller 24 receives input signals as a digital data stream representing the gray scale or color values of an image to be reproduced. In the case of a color press, FIG. 1 represents one print unit for printing one color component or signature of an original document, e.g., the cyan component. For a color press, there would be three more print units located downstream from cylinder 12 for printing the other color components, namely, magenta, yellow and black, as shown, for example, in U.S. Pat. No. 4,792,860, the contents of which are hereby incorporated by reference herein.

Alternatively, the FIG. 1 apparatus, modified to include a plural color inking station, may print all four color signatures by itself, as described, for example, in U.S. Pat. No. 5,325,120.

The data representing the various color components of a color original are applied to the apparatus in successive strings. For example, the system may receive the data in the order cyan, magenta, yellow and black. Preferably, a mass memory 24*a* is associated with controller 24 for storing the relatively large amount of data necessary to operate the apparatus.

In order to print on web W, controller 24 controls the print head 14 so that, as the print cylinder 12 rotates, the print head records on the cylinder surface 12*a* electrostatic images corresponding to at least one of the color components represented the input data stream. The print head may be a microtunnel-type head disclosed in U.S. Pat. No. 5,325,120.

The inking head 16 may be similar to the one described in U.S. Pat. No. 4,792,860 or U.S. Pat. No. 5,325,120. It supplies, in a molten state, thermoplastic ink composed of pigment particles in one of the four printing colors dispersed in a binder. Preferably, the print cylinder surface 12*a* is mildly ink phobic so that ink does not tend to adhere to the surface of the cylinder except that those locations which are charged by the print head 14. For example, if a cyan image is being written on print cylinder 12, the inking head 16 will dispense cyan ink. Resultantly, when the electrostatic image on the cylinder surface 12*a* has advanced past the inking head 16, cyan ink from head 16 will be acquired by the charged areas of that image thereby developing a cyan image on the print cylinder surface 12*a*. As described in the above patents, cylinder 12 is heated so that the ink remains in a molten state on surface 12*a* and adheres to the surface at those charged areas.

As will be described in more detail later, the amounts of ink picked up or acquired by the charged areas on cylinder surface 12*a* are monotonically increasing with the field intensities emanating from those charged areas. This variation of field intensities over the image on the print cylinder surface 12*a* facilitates reproduction of a full gray scale.

As the cylinder 26 continues to rotate, the developed portion of the image on surface 12*a* is advanced to the ink transfer station 18 constituted by the nip formed by cylinders 10 and 12. Controller 24 controls the position of the image on cylinder 12 so that when that image is developed and advances through the nip, the developed image thereon is transferred to the proper location on the web W. There is a total transfer of the ink from cylinder surface 12*a* to the web W at the transfer station 18 because the transfer is accomplished thermodynamically by means of a phase transformation of the ink which switches from a hot melt liquid condition to a solid state condition at the line of contact with a relatively cool web W.

The charged areas of the cylinder surface 12*a*, now devoid of ink, may be advanced past the erase station 22. This station may contain means, such as an ultraviolet light 22*a*, for rendering the cylinder surface 12*a* conductive so that the charges thereon become dissipated. Thus, when the cylinder surface 12*a* exits station 22, it is completely discharged and ready for re-imaging by write head 14 during the next or a succeeding revolution of cylinder 12. In the meantime, an image representing one color component, e.g, the cyan component, of the original image will have been printed on web W.

The FIG. 1 apparatus differs from the printing apparatus described in the above patents in that its print cylinder 12 has an anisotropic recording surface so that the electric charges acquired from the print head 14 during a write operation distribute themselves on the cylinder surface 12*a* non-uniformly so that they produce non-uniform electric fields which extend above the surface of the cylinder.

Thus, when the print cylinder 12 is rotated to position these nonuniformly charged areas opposite the inking head 16, the charged areas take ink from the inking head by the process of dielectrophoresis. That is, the ink particles are polarized by the non-uniform cylinder surface 12*a* where the fields are strongest in amounts monotonically increasing with the field strengths at those charged areas.

Figure 2:
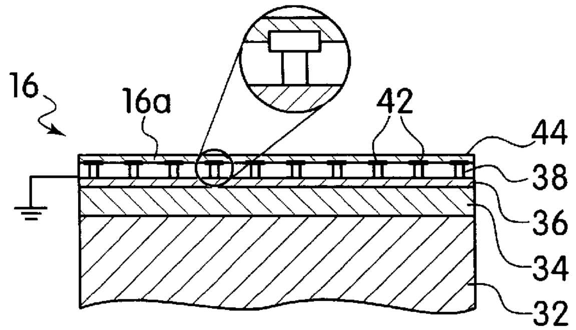
FIG. 2 is a fragmentary sectional view on a much larger scale taken along line 2—2 of FIG. 1.

As best seen in FIGS. 1 and 2, cylinder 12 comprises a rigid core 32 which may be of steel or aluminum. Preferably, the core is slotted as shown to reduce its weight and to allow for the circulation of air through the core to cool it. Surrounding core 32 is a sleeve 34 of a material such as ceramic which is a good thermal and electrical insulator. Deposited on the surface of sleeve 34 is a layer 36 of conductive material such as copper metal. This conductive layer functions as a ground plane for the print cylinder 12.

Surrounding layer 36 is a thin, e.g., 1 μm, layer 38 of a dielectric material such a silicon nitride or sapphire having very high resistivities. Layer 38 is rendered anisotropic by forming a pattern of conductive spots 42 in the layer 38 which are connected electrically to conductive layer 36. The grounded spots may be formed, for example, by providing a pattern of tiny through-holes in layer 38 extending in the thickness direction and filling the hole with conductive material such as metal or polysilicon. For ease, of illustration, these spots 42 are shown in the drawing figures to be relatively large and widely spaced apart. In actuality, however, the spots may be only less than 1 μm in diameter and be spaced only a few μm apart. As shown in FIG. 1, the spots 42 in cylinder 12 are arranged in columns and rows in a rectilinear pattern, e.g., 10×10 spots per pixel. Obviously, however, other patterns may be used. For best results, the spot pattern for each pixel should be periodic.

Preferably, also, cylinder 12 is provided with a very thin outer coating 44 of an abhesive material such as polytetrafluoroethylene (Teflon) or others which are ink phobic. This abhesive surface coating prevents ink from adhering to non-charged areas of the cylinder surface 12*a* and also minimizes ink smear on that surface.

When the FIG. 1 apparatus is up and running, during a write operation, the array of microtunnels comprising write head 14 produce tiny beamlets of positive ions as described in the above U.S. Pat. No. 5,325,120. The ions tend to migrate toward the mouths of the microtunnels where they are attracted by the electrically grounded layer 36 of print cylinder 12. The arriving positive charges accumulate on the recording surface 12*a* of cylinder 12 resulting in the deposition of charge domains, each having an individual coulombic charge density as controlled by the bias on the gate electrode, if present, associated with the corresponding microtunnel. The plasma in the microtunnels can be made to stick out from the end of the microtunnel by suitably increasing the tunnel currents. The plasma can be considered to be a gaseous wire which charges the dielectric surface to the potential of the plasma. As described in the '120 patent, these bias levels may be set digitally so that individual microtunnels may be activated separately and controlled by the controller to produce electrostatic images composed of imagewise patterns of charge on the cylinder surface 12*a*.

It is a feature of this invention, however, that when cylinder 12 is written on by print head 14, the surface of layer 38 will be charged nonuniformly by each microtunnel of the print head. More particularly, the presence of the grounded spots 42 will bring the surface potential of the cylinder periodically down to zero volts.

Thus, a strong field will exist around each spot 42 because the surface potential on the cylinder has to rise in a very short distance to the average voltage that was applied to the dielectric material by the print head charging process. Thus, in the illustrated apparatus, each pixel of the electronic image applied to print cylinder 12 will consist of a microscopic pattern of nonuniformly distributed charge domains which produce nonuniform electric fields—so called microfields—extending out from the cylinder surface 12*a*. However, those charges average out over the pixel so that macroscopically the charge is proportional to the gray scale or color value for that pixel.

Thus, when the charged areas of the cylinder 12 are rotated opposite the inking head 16, the nonuniform electric field at each spot position will polarize the developing medium and draw ink particles to cylinder surface 12*a* by dielectrophoresis in an amount monotonically increasing with the charge at each spot. Ink will not adhere to uncharged areas of cylinder surface 12*a* particularly due to the presence of the abhesive coating 44.

While write heads other than the microtunnel write head described above may be able to deposit charges on the dielectric surface, the microtunnel write head is preferred when the spots are grounded as shown in FIG. 2.

It should be noted that the grounded spots of FIG. 2 need not be fully grounded, but may merely be connected to the ground plane by materials of lower resistance than the dielectric material. The spots also could be embedded within the dielectric material, as long as defined areas are formed on the recording surface which have a potential closer to ground.

As opposed to the above-described embodiment in which ions or charges are deposited on the dielectric surface and then migrate toward grounded spots, it is also possible to directly charge non-grounded spots, preferably using direct wire contacts. In one embodiment, a grounded layer may be provided underneath the dielectric material, so that the dielectric material between the charged spot and the grounded layer may be charged, acting like a capacitor. As the write head moves away, the spot therefore retains much of its charge. The dielectric material at the surface surrounding the spot retains approximately a zero or very little charge. Therefore microfields form between the charged spot and the uncharged dielectric at the surface.

Figure 3:
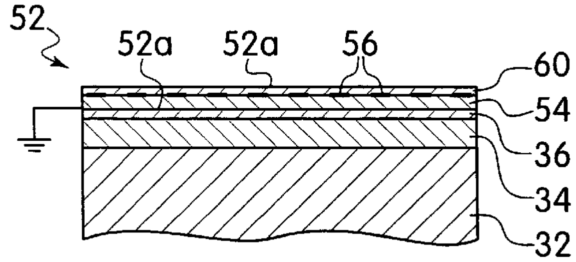
FIG. 3 is a similar view showing a second print cylinder embodiment.

FIG. 3 illustrates such a print cylinder 52. Like cylinder 12, cylinder 52 has a core 32, a ceramic sleeve 34 and a conductive layer or ground plane 36. Formed on that layer 36 is a dielectric layer 54 which is provided with a pattern of conductive areas or spots 56 thereon. These spots are not connected to the conductive layer 36. Alternatively, the spots may actually be embedded on or less preferably completely within the dielectric material 54 as well, but the recording surface should have areas which have a higher conductivity than the normal dielectric layer 54 and which may retain a charge after the write head moves away. Cylinder 52 also may have an outer abhesive coating 60 whose surface constitutes the recording surface **52*a* of cylinder 52**. However, it is preferable in this embodiment that the spots or defined areas of higher conductivity be directly contactable with contacts of the write head.

Figure 4:
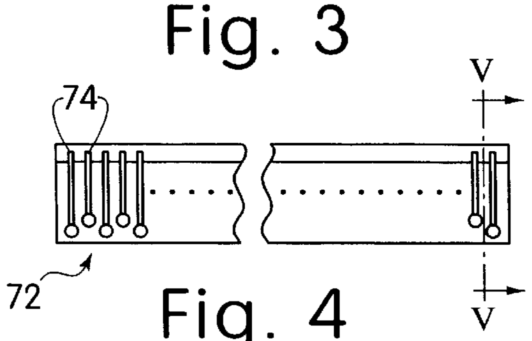
FIG. 4 is a bottom view of a print head for use in the FIG. 1 apparatus incorporating the FIG. 3 print cylinder.
Figure 5:
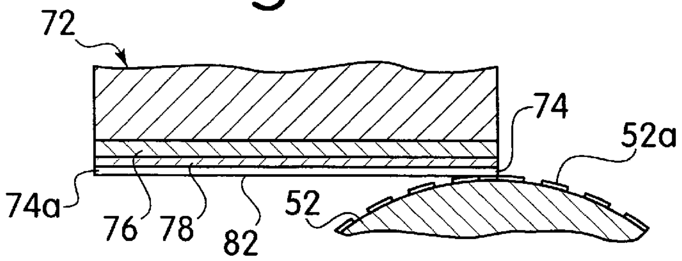
FIG. 5 is a sectional view on a much larger scale taken along line 5—5 of FIG. 4.

An electronic image may be written directly onto the recording surface **52*a* of print cylinder 52 using sliding contacts. FIGS. 4 and 5 illustrate a print head 72 incorporating a linear array of wirelike contacts or voltage delivery points 74 which may extend across the entire width of the printing cylinder. The contacts or voltage delivery points 74 are cantilevered and the print head 72 may be arranged so that the contacts resiliently engage the recording surface 52*a* of cylinder 52 at the locations of the conductive spots 56 thereon. Imagewise-dependent voltages are applied to the various contacts 74 at the instant they are disposed opposite the conductive spots 56 so that the spots become charged. Each contact 74 can be quite small, for example several contacts within a pixel width, because it only has to contact the corresponding spot 56** at one point for a very short time (in the order of nanoseconds) for the conductive spot to become completely charged to the full potential of the corresponding contact. The contact also could be as wide as a pixel, and a single contact also could contact more than one spot.

The conductive spot 56 therefore acts as one plate of a capacitor and the ground plane 36 as the other. The dielectric material between the spot and the ground plate thus may be charged by the write head. When the write head moves away from the spot, the dielectric material under the spot, and the connecting spot, retains a charge and therefore field lines will emerge transversely from the charged spots and the essentially uncharged surrounding dielectric material. Microfields are thus formed which will attract ink around the spots. The presence of the spots thus greatly enhances the effectiveness of the print cylinder because stronger fields can be produced as compared to those produced by wire-like contacts on a plain dielectric surface. It can be generally approximated that with narrow contacts virtually no charge is left on the non-metallized dielectric. The potential around each spot will be closer to ground potential (desirable for producing high-transverse fields), the thinner the dielectric layer 54.

The cylinder 52 will thus operate in more or less the same way as cylinder 12 to acquire a pattern of electrical charge domains which is microscopically periodically varying, but macroscopically imagewise-dependent. Thus, the charge domains will produce non uniform, imagewise dependent electric fields which extend up from the cylinder surface **52*a*** and are able to polarize and attract a developing medium to that surface.

The write head 72 with its cantilevered contacts 74 can be made using standard printed circuit technology. The write head shown in FIG. 5 includes a substrate 76 of an insulating material such as ceramic or glass which extends the full width of the print cylinder 52. Deposited on the substrate is a selectively etchable insulating layer 78 of silicon dioxide or the like. On that layer is deposited a metal conductive layer 82. The deposited metal may be patterned (i.e., etched after application of a photoresist) to provide a contact 74 every 50 $\mu$m or so with suitable width-to-spacing dimensions. For example, the spacing may be one-half the metal width, or as desired. At one end of the contacts, pads **74*a*** may be provided for connecting the contacts to the source of the printing voltages, i.e. a wire charging member. These paths may be displaced with respect to each other as shown to provide enough space to bond wires or to provide contact areas for a removable contact assembly (not shown).

To cantilever the working ends of contacts 74, the layer 78 of insulating material at the underside of substrate 76 may be etched away adjacent to the contact working ends so that contact ends are released from the substrate and float, as shown schematically in FIG. 4. If desired, the conductive layer 82 may be formed as a bi-metallic layer so that, when released, the metal will bend away from the substrate in a bi-metallic spring-like fashion so that the contacts 74 make good sliding resilient engagement with the cylinder surface **52*a***.

Forming a write head in this fashion provides accurate spacings between the contacts 74 of the write head. If desired, various elaborations may be made. For example, the ends of contacts 74 can be thickened for improved wear resistance. Also, those ends can be slit to form a brush to achieve better resiliency and improved contact with the conductive spots on the print cylinder.

Figure 4A:
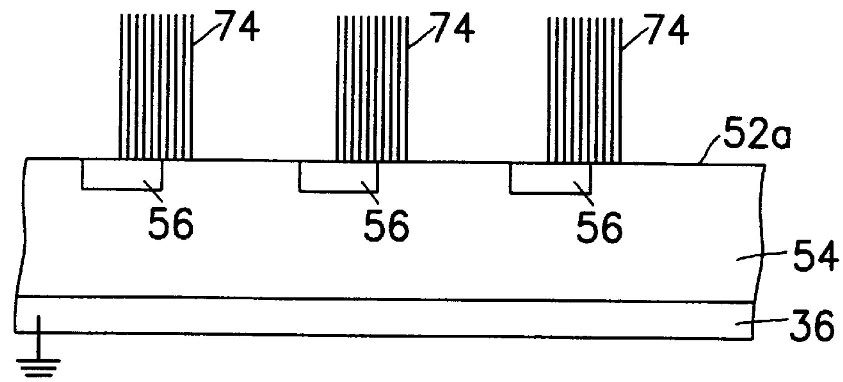
FIG. 4*a* shows a side view of a print head similar to the FIG. 4 print head interacting with a print cylinder.

Each voltage delivery point 74 further may be formed as a plurality of minute electric fingers, as shown in FIG. **4*a*. In FIG. 4*a* the spots 56 are shown embedded on the dielectric layer 54. The electric fingers of a single delivery point 74 are all charged to a similar voltage, but have a very high resistivity in a direction parallel a line running directly across the width of the recording surface. The controller for the write head can set the voltage of each delivery point individually, as described above. Because of manufacturing inaccuracies, it is often possible that the contact 74 will contact not only the spot, but rather also a portion of the dielectric material, as illustrated in FIG. 4*a*. However, because of the greater difference and the lack of a conductive spot which facilitates delivery of the electric charge, the charge on the dielectric at the surface is minimal. Therefore, when the voltage contact 74 moves away from the spot, microfields form between the spot 56**, which remains charged, and the dielectric surface, which, to a great degree, remains uncharged.

It is also possible that spots shown in FIG. 4*a* contact the ground plane through resistors or resistive connectors having a lower resistivity than that of the dielectric material. When the delivery points move away from the spots, the spot will retain a charge for a certain time, even if its rate of dissipation is faster than if no resistors were present. The optimal resistivity between the spot and the ground plane will depend on a number of factors, including the print cylinder speed, voltage limits used, desired ink thickness, and others. Resistivity can also be altered by varying the composition, depth and size of the spots.

When contacted by metal wires, the spots preferably are made of a hard metallic compound, such as TiN, ZrN or zirconium oxide.

Figure 4B:
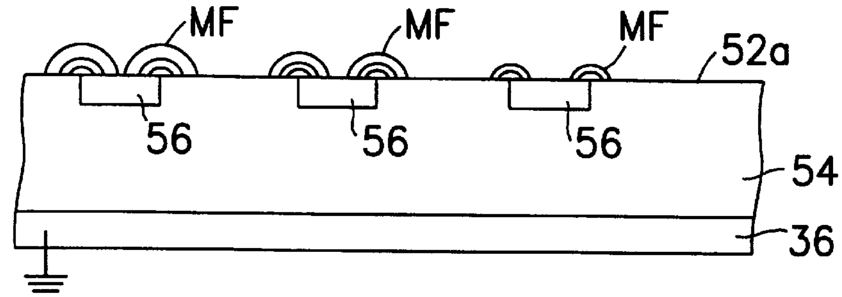
FIG. 4*b* illustrates the microfields which form at the surface of the recording member.

FIG. 4*b* depicts illustratively microfields MF which form at the surface 52*a* between the spots and the essentially uncharged dielectric material as the spots 56 move away from the contacts 74. The microfields MF then attract ink from the inking station as described above.

Figure 6:
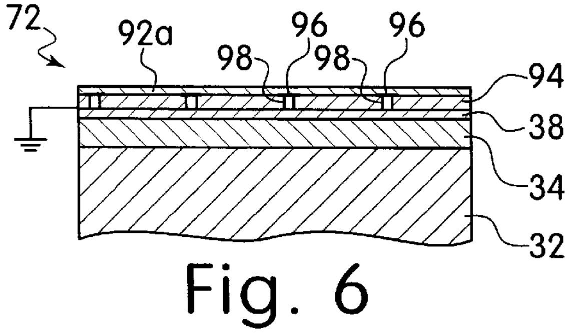
FIG. 6 is a view similar to FIG. 3 showing another print cylinder embodiment.

FIG. 6 illustrates another print cylinder embodiment shown generally at 92 having a somewhat different anisotropic dielectric layer 94 on conductive layer 38. Layer 94 also carries a pattern of conductive spots 96. However, alternate spots 96 are connected by conductive paths 98 to the ground plane 36. The conductive paths 98 may be formed by pin holes filled with conductive material, by plated vias or even by tiny wires. If desired, the conductive paths 98 may be of a semiconductive material, e.g., polysilicon, so that they have a relatively high resistance. This will produce moderately higher transverse electric fields above the recording surface 92*a* of cylinder 92 when the cylinder is written on by write head 72. Actually, the polysilicon connection may be used by itself as the conductive spot 96; it need not be covered by another better conducting metal because, for electrostatic purposes, only very low conductances are required for the spots 96. The same is true for the spots 42 in cylinder 12 (FIG. 2).

In another embodiment shown, one may eliminate the need for a ground plane in the print cylinder by oppositely charging non-grounded adjacent spots of the spot pattern. For example, in the FIG. 3 cylinder, odd numbered spots 56 may be charged by a positive potential and the even numbered spots 56 may be charged by a corresponding negative potential using the contact-type write head 72 depicted in FIGS. 5 and 6. This results in field lines traversing the space between the two sets of spots so that ink will be attracted between the spots.

Figure 7:
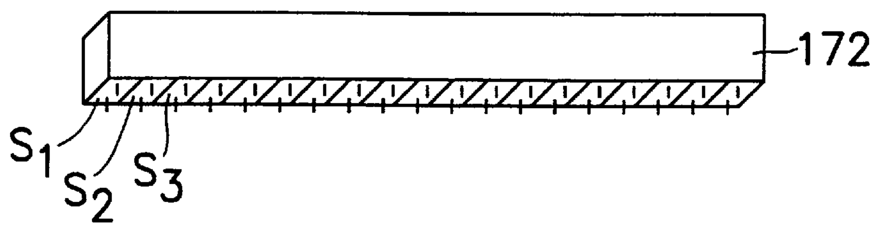
FIG. 7 schematically shows a write head having sets of delivery points for delivering a voltage difference parallel to a direction of movement of a dielectric surface.
Figure 8:
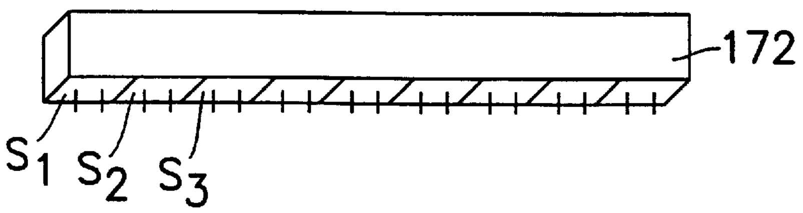
FIG. 8 schematically shows a write head having sets of delivery points for delivering a voltage difference perpendicular to a direction of movement of a dielectric surface.

The various methods of charging such a surface without a ground plane are better understood by reference to the schematically drawn write heads shown in FIGS. 7 and 8. In FIG. 7, a write head 172 is shown which has a plurality of sets S1, S2, S3 etc. of two delivery points arranged parallel to the direction of movement of a dielectric recording surface. The recording surface can be a plain dielectric surface, or, preferably, one with spots or areas of higher conductivity on the surface as described above. In this embodiment, the write head can set a voltage difference for each set S1, S2, etc. independently based on electronic data representing the image to be recording on a dielectric recording surface. Therefore, successive lines of the image are written by the write head across the entire width of the recording surface as a recording surface passes.

The voltage difference preferably varies between zero and a maximum of 30 to 200 volts, thereby producing variable ink attraction depending on the voltage difference.

As shown schematically in FIG. 8, it is also possible to arrange the sets of the voltage delivery points of the write head 172 in a direction perpendicular to the direction of movement of the recording surface. These may be formed in the same manner described with respect to the write head of FIGS. 4 and 5.

With the schematically shown embodiments of both FIGS. 7 and 8, there also may be more than two delivery points in each set, for example to have a set of three delivery points with voltages V1,V2,V1. In the embodiment of FIG. 8, for example, the next set may then have voltages V1,V3, V1, so that the voltages of delivery points in sets next to each other are the same. This helps prevents the formation of microfields between two adjacent sets, if this is not desired.

Figure 9:
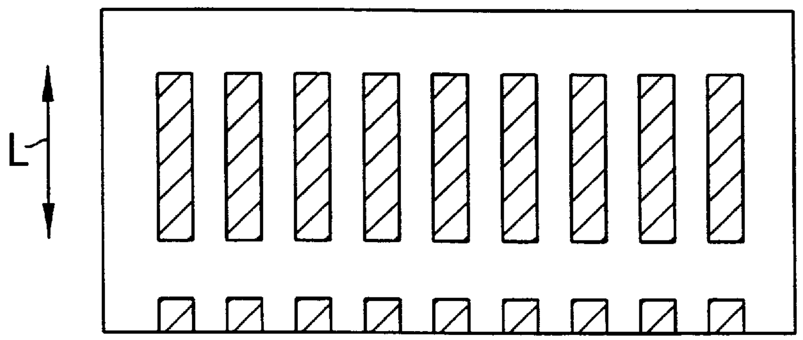
FIG. 9 shows a dielectric surface having long rectangular spots.

The recording surface for this embodiment may be a plain dielectric surface, but also may have spots as described above. As shown in FIG. 9, the spots 156 may be formed as rectangles having a length L the full size of a pixel, for example 50 micrometers.

In the embodiments of FIGS. 7 and 8, care should be taken to assure that the plus and minus contacts do not touch the same spot at the same time. In that event, even with a current limiting power supply or high resistance contacts, the two contacts will most likely cancel themselves out and little or no charge will be deposited on the print cylinder.

For all of the embodiments described above, the varying voltages may provided by a direct current source. However, alternating current sources may also be used, with the voltage amplitude being variable.

Figure 10:
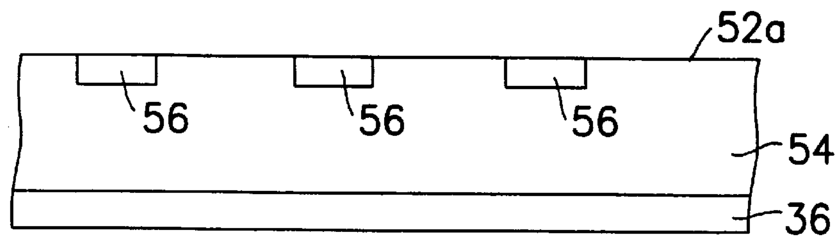
FIG. 10 shows another embodiment of the recording member for use with an alternating current write head.

With an alternating current source, it is also possible to eliminate the need for an grounding the underlying layer of FIG. 3, as shown in FIG. 10. Layer 136 is an ungrounded conductive layer, which upon rotation of the print cylinder obtains an approximately constant voltage equal to the average voltage of the varying alternating voltage. The varying voltage of contact points at the surface 52*a* may then be used to charge the dielectric, since the layer 136 voltage remains approximately constant.

It should also be noted that with all the embodiments having an underlying grounded layer, it is possible instead to provide a layer with a constant voltage instead of a grounded layer.

A print member with a charged anisotropic surface described in any of the embodiments above can interact with a dielectric developing medium or any other dielectric material with a dielectric constant greater than one. Thus, while we have described the present invention as used in printing apparatus incorporating an inking station which dispenses thermoplastic inks, the described print members can also be used to receive solid uncharged dielectric inks and uncharged toners. Therefore the term ink as used in the application is meant generally as any dielectric developing medium with a dielectric constant greater than one and is not limited to liquid inks.

Charged, rather than uncharged, toners or inks may also be used with the above-described embodiments, although the resultant desired ink attraction and thicknesses must then be modified to account for the increased attraction.

It should also be noted that for charging the spots or more conductive areas that other types of contact points may be used instead of the wire contact points shown in FIG. 4. The write head may also comprise a plasma charging member and deliver a charge through individual plasma delivery points, similar to the microtunnel plasma device described above. The write head may also have a gas charging device and charge the spots through gas delivery points. For example, the contact wires of the embodiment shown in FIG. 4 may be developed so as to not actually contact the recording surface but to deliver their charges through the air.

It will thus be seen that the objects set forth above, among those made apparent from the preceding description, are efficiently attained. Also, certain changes may be made in the above constructions without departing from the scope of the invention.

It is also to be understood that the following claims are intended to cover all the generic and specific features of the invention described herein.

What is claimed is:

1. Recording apparatus comprising:

a recording member having an outer portion formed of a dielectric material and a plurality of spots, the spots being embedded in the dielectric material of the outer portion;

the outer portion and the spots being disposed so as to form an outer recording surface having areas of differing conductivity;

an ink-phobic layer disposed on the recording surface; and a writing head located outside of the recording member adjacent to the outer recording surface for creating variable electric charges on the outer recording surface, the variable charges corresponding to a part of an image to be recorded, the write head thereby being in electrical contact with the recording member.

2. The apparatus as recited in claim 1 wherein the spots are located on the outer portion.

3. The apparatus as recited in claim 1 wherein the write head comprises a plurality of voltage delivery points, the write head capable of setting the voltage of each delivery point independently.

4. The apparatus as recited in claim 3 wherein each delivery point comprises a plurality of electric fingers.

5. The apparatus as recited in claim 1 wherein the write head applies a variable voltage to the recording surface, the voltage having an upper limit of between 30 and 200 volts.

6. The apparatus as recited in claim 1 wherein the spots are made of metal.

7. The apparatus as recited in claim 1 wherein the write head comprises a wire charging member, the wire charging member delivering charges to the recording surface through wire contacts.

8. The apparatus as recited in claim 1 wherein the write head comprises a gas charging member, the gas charging member delivering charges to the recording surface through a gas medium.

9. The apparatus as recited in claim 1 wherein the write head comprises a plasma charging member, the plasma charging member delivering charges to the recording surface through a plasma medium.

10. The apparatus as recited in claim 1 wherein the write head has a plurality of sets of at least two delivery points, the delivery points of each set delivering a voltage difference so as to charge the dielectric material between two adjacent spots, the write head capable of setting the voltage difference between the delivery points of each set independent of the voltage difference of other sets.

11. The apparatus as recited in claim 10 wherein the recording surface has a direction of movement and the delivery points of each set are arranged parallel to the direction of movement.

12. The apparatus as recited in claim 10 wherein the recording surface has a direction of movement and the delivery points of each set are arranged perpendicular to the direction of movement.

13. The apparatus as recited in claim 1 further comprising an inking station adjacent to the recording surface for applying ink to the recording surface.

14. The apparatus as recited in claim 1 wherein the write head comprises a direct current voltage source.

15. The apparatus as recited in claim 1 wherein the write head comprises an alternating current voltage source.

16. Recording apparatus comprising:

a recording member having an outer portion of a dielectric material and a plurality of spots;

the outer portion and the spots being disposed so as to form an outer recording surface having areas of differing conductivity; and a write head located outside of the recording member adjacent to the outer recording surface for creating variable electric charges on the outer recording surface, the variable charges corresponding to a part of an image to be recorded, the write head thereby being in electrical contact with the recording member, the recording member further including an underlying layer beneath the outer portion, the spots communicating with the underlying layer so as to be more conductive than the outer portion.

17. The apparatus as recited in claim 16 further comprising connectors between each spot and the underlying layer, the connectors having a resistance less than the dielectric material.

18. Recording apparatus comprising:

a recording member having a dielectric recording surface with a plurality of relatively conductive defined areas;

an ink-phobic layer disposed on the dielectric recording surface; and a write head adjacent to the recording surface for delivering charges corresponding to part of an image to be recorded on the recording surface, the write head having a plurality of voltage delivery points disposed across a width of the recording surface for creating microfields around the defined areas, the write head thereby being in electrical contact with the recording member.

19. The apparatus as recited in claim 18 wherein the recording member further comprises an underlying layer beneath the recording surface, the defined areas interacting with the underlying layer so as to be relatively conductive.

20. The apparatus as recited in claim 18 wherein the delivery points are arranged as sets of at least two delivery points, each set of delivery points for providing a voltage difference between adjacent defined areas.

* * * * *